Figure 1:
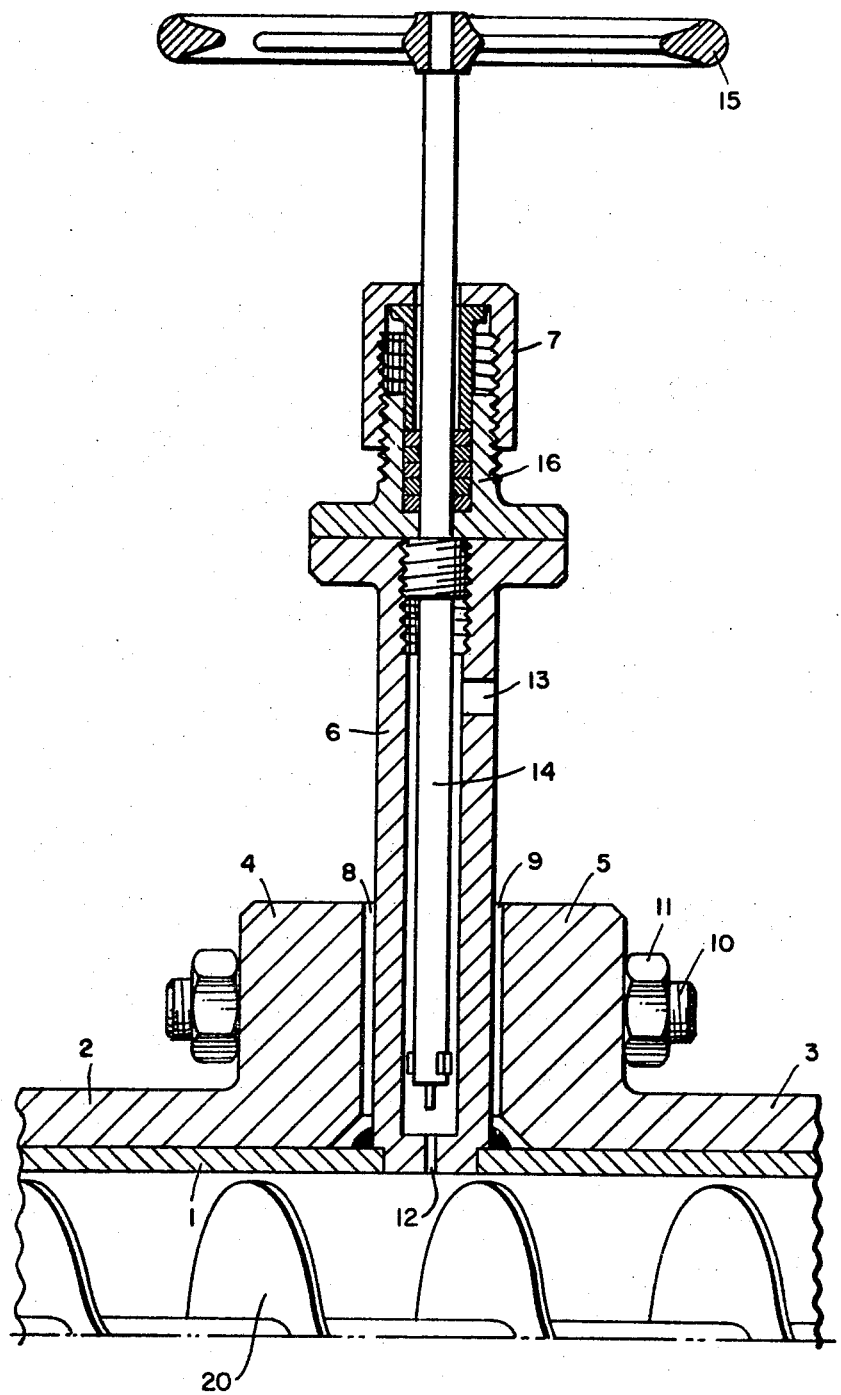

United States Patent

[11] 3,631,883

| [72] | Inventors | Wolfgang Guenther<br>Ludwigshafen;<br>Guenter Jeckel, Landau, both of Germany |
|---|---|---|
| [21] | Appl. No. | 813,062 |
| [22] | Filed | Apr. 3, 1969 |
| [45] | Patented | Jan. 4, 1972 |
| [73] | Assignee | Badische Anilin & Soda-Fabrik AG<br>Ludwigshafen, Germany |
| [32] | Priority | Apr. 3, 1968 |
| [33] | | Germany |
| [31] | | P 17 78 166.7 |

[54] SCREW EXTRUDER WITH MEANS FOR METERING LIQUID ADDITIVES INTO A CYLINDER SECTION OF THE SCREW EXTRUDER
4 Claims, 2 Drawing Figs.

[52] U.S. Cl. .................................................. 137/317,
137/321, 137/375, 18/12, 251/145
[51] Int. Cl. ...................................................... F16k 51/00
[50] Field of Search ........................................... 137/375,
321, 315, 317; 18/12, 13; 251/145

[56] References Cited
UNITED STATES PATENTS

| 2,848,739 | 8/1958 | Henning | 18/13 X |
| 3,451,103 | 6/1969 | Aykanian et al. | 18/12 X |
| 3,461,498 | 8/1969 | Ramaika | 18/12 X |
| 3,460,765 | 8/1969 | Lord | 137/315 X |

FOREIGN PATENTS

| 6,605,639 | 11/1966 | Netherlands | 18/12 |
| 1,167,060 | 7/1958 | France | 251/145 |

*Primary Examiner*—William R. Cline
*Attorney*—Johnston, Root, O'Keeffe, Keil, Thompson & Shurtleff

ABSTRACT: Screw extruder fitted with a liner and an injection valve which is located between the feed opening and the die of the extruder for metering liquid additives into a cylinder section of the screw extruder, wherein the cylinder section is divided into two flanged segments and the body of the injection valve is located between the flanges of the segments of the cylinder section and secured to the undivided liner which is embraced by the segments of the cylinder section.

INVENTORS:
WOLFGANG GUENTHER
GUENTER JECKEL

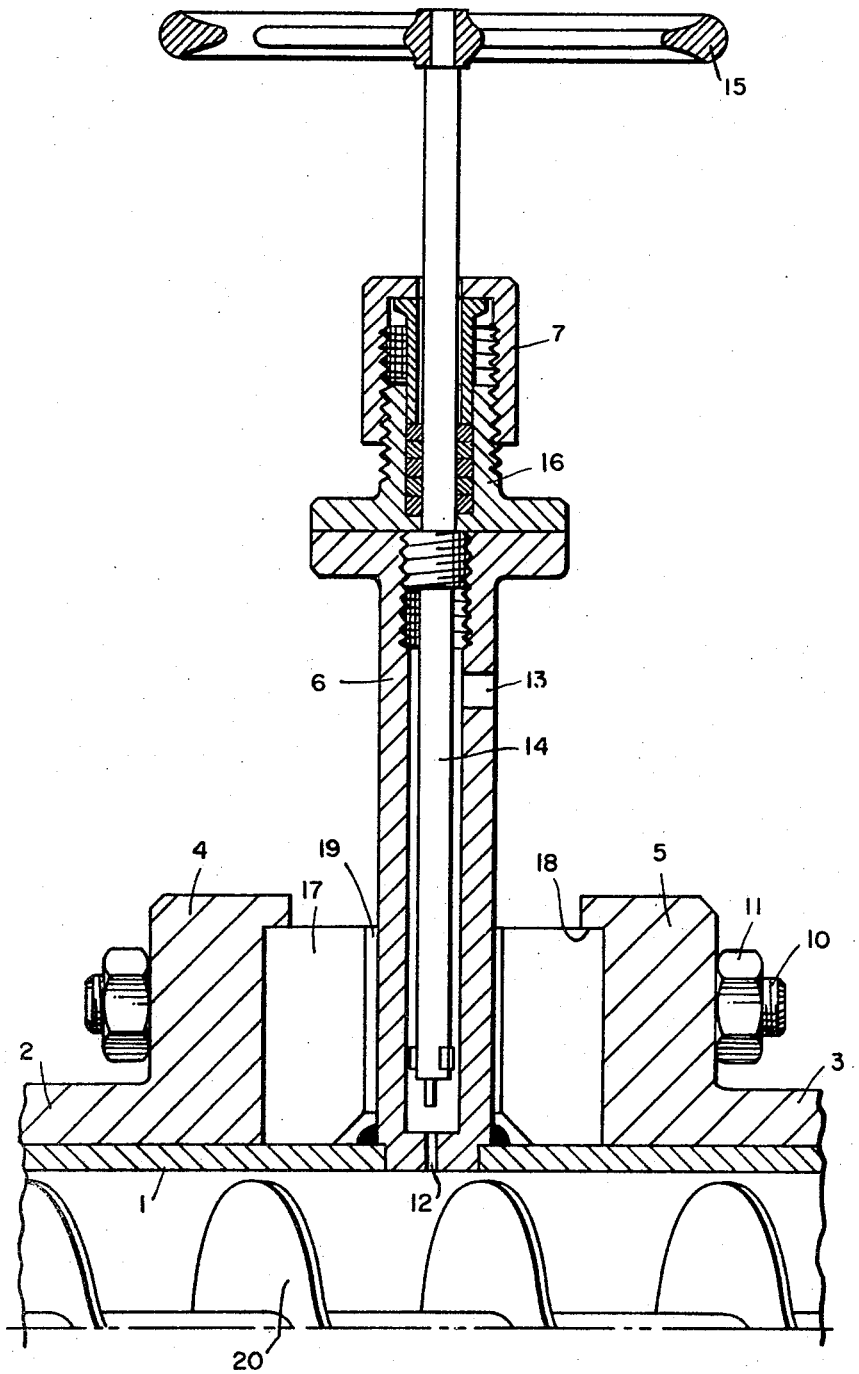

SCREW EXTRUDER WITH MEANS FOR METERING LIQUID ADDITIVES INTO A CYLINDER SECTION OF THE SCREW EXTRUDER

This invention relates to a screw extruder fitted with a liner and an injection valve which is located between the feed opening and the die of the extruder for metering liquid additives into a cylinder section of the screw extruder.

In various methods of processing highly viscous compositions, such as synthetic thermoplastics, liquid additives must be introduced into the composition while this is being homogenized and worked in a screw extruder.

A conventional arrangement consists in locating injection valves for the introduction of the liquid additives between the feed zone and the discharge zone of the screw extruder. In screw extruders which do not have a liner inside their cylinder such injection valves can be screwed, flanged or welded into the cylinder wall so that a liquidtight connection between the injection valve and the cylinder of the screw extruder is achieved.

However, constructional difficulties arise when injection valves are required to be fitted to screw extruders whose cylindrical casing contains a liner in which the revolving screw works. The provision of a liner inside the cylinder casing of the extruder has the advantage that, if the screw shaft or the liner should develop a defect, the liner can be withdrawn, possibly together with the screw shaft, and replaced. However, before this can be done fittings attached to the liner and to the cylinder casing must first be disconnected from the liner. For this reason the injection valves in screw extruders fitted with a liner are conventionally shrunk into the liner, since an injection valve that is simply pressed into contact with the liner from the outside by bolts and interposed seals is liable to cause distortion of the liner.

However, injection valves that have been shrunk into the liner have the drawback that they tend to work loose in their seating as a result of the temperature and pressure stresses that arise during operation so that leakage occurs. The liquids that are to be metered into the machine can then enter the space between the liner and the cylinder casing and they either issue to the outside at the next flanged joint or they combine with the highly viscous mass at the end of the liner and leave via the nozzle at the extruder head without having been mixed with the mass.

Similar problems arise if the injection valve is fitted at an intermediate flange and this is located between the abutting ends of two cylinder sections and two liner sections of the extruder. The two joints between the intermediate flange and the adjoining liner sections are very difficult to seal and the effects of fluctuating temperatures and pressures cause stresses which adversely affect the tightness of the joints.

In view of the difficulties encountered in providing a reliable seal between an injection valve and the liner, it is the object of the present invention to provide a liquidtight joint between an injection valve and a liner which joint is designed to withstand the strains and stresses caused by temperature and pressure fluctuations and adapted to be easily undone and remade for the purpose of withdrawing and reinserting the liner. In accordance with this invention this object is achieved by dividing the cylinder section into two flanged segments, whereas the liner between the segments of the cylinder section is undivided across the axis of the cylinder section, and by locating the body of the injection valve between the flanges of the segments of the cylinder section and connecting the valve body to the liner. The valve body may be welded, soldered or screwed into the liner and it may be embraced by the suitably recessed flanges of the segments without making contact therewith. In another appropriate embodiment of the invention the valve body may be embraced by the sides of an adapter without making contact therewith, said adapter being inserted between the flanges of the segments and divided in at least one plate parallel to the longitudinal axis.

Two embodiments of the means according to the invention are illustratively and schematically shown in the accompanying drawings, in which FIG. 1 is a longitudinal section of two segments of a cylinder section embracing an undivided liner, and of the injection valve secured to the liner, and FIG. 2 is a likewise a longitudinal section of the segments showing the valve body attached to the liner embraced by an adapter inserted between the two segments.

Identical structural members in the two Figures bear the same reference numbers.

Referring to FIG. 1 there is provided between the flanges 4 and 5 of segments 2 and 3 of a cylinder section the body 6 of an injection valve 7, the valve body being welded into a liner 1 which is inserted into the cylinder section and which is not divided across the longitudinal axis. Since the liner 1 may move in the cylinder when it is exposed to temperature and pressure changes, the flanges 4 and 5 are provided with recesses 8 and 9 embracing the valve casing 6 without making direct contact therewith. The flanges 4 and 5 are held together by nuts 11 and bolts 10. Should the liner 1 or a screw shaft 20 contained therein develop a defect, the valve body 6 can be readily detached from the liner 1 after the flanges 4 and 5 have first been pulled apart. Before or after a fresh liner is introduced into the segments 2 and 3 of the cylinder section the valve body 6 is rewelded to the liner 1 and the flanges 4 and 5 are bolted together.

The liquid additives that are to be metered into the cylinder section are introduced into the valve body 6 through a bore 13 and enter the interior of the cylinder through the injection orifice 12. The injection orifice 12 can be closed by a valve spindle 14 which is axially movably guided inside the valve body 6. The spindle 14 can be adjusted by a handwheel 15 arranged on its end or by a motor or hydraulic means. A stuffing box 16 seals off the spindle 14 from the outside.

In the embodiment of the proposed arrangement shown in FIG. 2 an adapter 17 is inserted between the flanges 4 and 5 of the segments 2 and 3. This adapter is divided in a plane parallel to the longitudinal axis and takes up any transverse thrusts applied to the liner by the pressure inside the screw extruder and transmits them to the flanges 4 and 5. For this purpose the adapter 17 is pressed radially against the liner 1 by retaining faces 18 machined into the flanges 4 and 5 and is axially gripped between the flanges 4 and 5 by the nuts 11 and bolts 10. The two halves of the adapter are each provided with a recess 19 to embrace the valve body 6 of the injection valve 7, which is welded to the liner 1, without there being direct contact between the adapter and the valve body. Should the liner require removal the flanges 4 and 5 are separated and the adapter 17 is removed, thus permitting the valve body 6 to be easily detached from the liner 1. Before or after a fresh liner is introduced into the segments 2 and 3 of the cylinder section, the valve body 6 is welded to the liner 1 and the adapter 17 is then inserted and bolted to the flanges 4 and 5.

The advantage of the proposed arrangement over conventional fittings resides substantially in that a liquidtight seal is formed between the injection valve and the liner inserted into the cylinder section of a screw extruder, and in that said seal is not affected by temperature and pressure changes occurring in the cylinder during operation, while at the same time the connection can be readily undone and remade when the liner requires replacement.

We claim:

1. A screw extruder comprising a cylindrical screw barrel having axially aligned, separate, hollow, cylindrical sections with a circumferential joint formed between the opposed, axial ends thereof, a hollow, cylindrical liner on the inner faces of said sections and bridging said joint, a screw rotatably mounted in said liner, an injection valve mounted in said liner at said joint with its valve body extending through and projecting outwardly from said joint out of contact with said sections, and seal means on the base of said valve body and on said liner providing a fluidtight joint therebetween.

2. A screw extruder as claimed in claim 1, flanges respectively on said opposed, axial ends, opposed, radial recesses in opposed faces of said flanges; and said valve body being spaced from the faces of said recesses.

3. A screw extruder as claimed in claim 1, flanges respectively on said opposed, axial ends, a split adapter held between the opposed faces of said flanges, a radial recess in said adapter, and said valve body extending through said recess in spaced relation to the walls of said recess.

4. A screw extruder as claimed in claim 1 wherein said fluid-tight joint is a welded or soldered seam.

* * * * *